(No Model.)
H. L. CAMERON.
AGRICULTURAL IMPLEMENT.
No. 422,718. Patented Mar. 4, 1890.
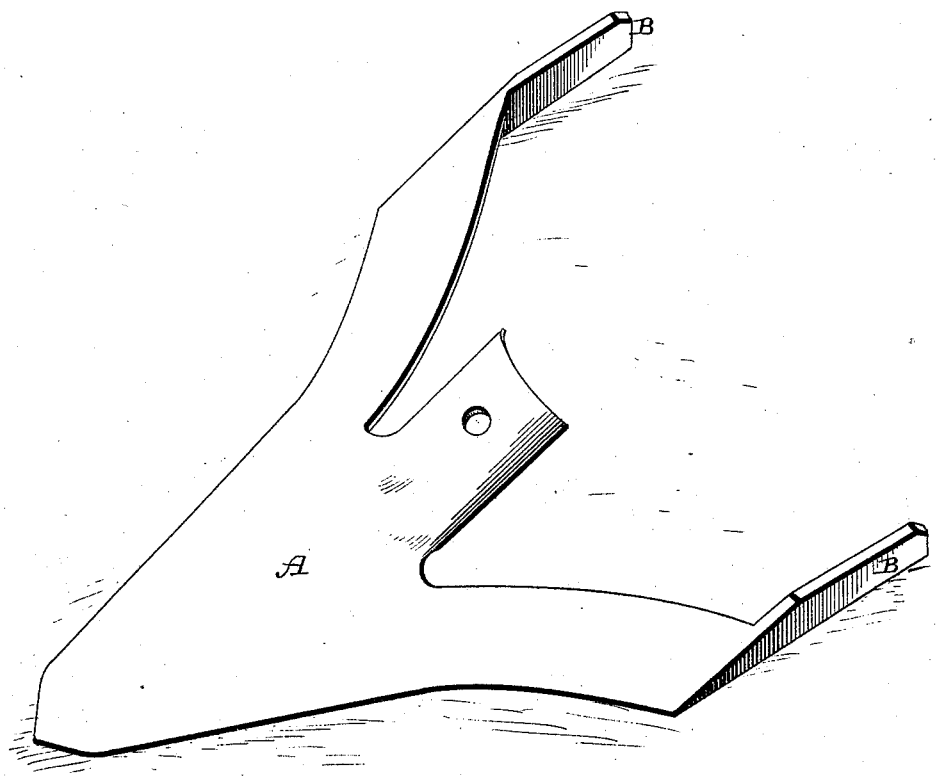
Witnesses:
E. P. Ellis,
L. J. Mague
Inventor:
H. L. Cameron,
per
F. A. Lehmann,
Att'y

UNITED STATES PATENT OFFICE.

HUGH L. CAMERON, OF DELVALLE, TEXAS.

AGRICULTURAL IMPLEMENT.

SPECIFICATION forming part of Letters Patent No. 422,718, dated March 4, 1890.

Application filed November 29, 1889. Serial No. 331,963. (No model.)

*To all whom it may concern:*

Be it known that I, HUGH L. CAMERON, of Delvalle, in the county of Travis and State of Texas, have invented certain new and useful Improvements in Agricultural Implements; and I do hereby declare the following to be a full, clear, and exact description of the invention, such as will enable others skilled in the art to which it pertains to make and use it, reference being had to the accompanying drawing, which forms part of this specification.

My invention relates to an improvement in agricultural implements; and it consists in a sweep of a suitable shape and construction having attached to each of its rear corners a vertical bar or wing, which extends parallel to the course of the plow and backward a suitable distance beyond the sweep proper, as will be more fully described hereinafter.

The object of my invention is to attach to the rear corners or wings of a sweep bars or runners, which rest upon the ground and steady the sweep and prevent it from wabbling or dodging while in use.

The accompanying drawing represents a perspective of a sweep which embodies my invention.

A represents a sweep of any desired shape or construction which may be preferred, and B the bars, which are secured to the rear corners or wings of the sweep, so as to form a part thereof. These bars are of a suitable length, width, and thickness, and are tapered to a point at their front ends. The rear corners or wings of the sweep are welded or otherwise secured to the inclined front ends of the bars, or the sweep and bars made in one piece, and these bars have their lower edges to rest upon the ground and to form runners or supports for the rear end of the sweep, so as to steady it and prevent it from wabbling or dodging while in use. These bars extend any desired distance to the rear of the corners of the sweep proper, and make it almost impossible for the sweep to have an uneven movement.

Having thus described my invention, I claim—

1. A sweep having horizontal parallel rearwardly-extending bars secured to or formed as a part of its rear corners or wings, and which bars form rests or supports, so as to prevent the sweep from wabbling, dodging, or having an uneven movement while in use, substantially as shown.

2. The combination of the sweep A with the bars B, having inclined front ends, the rear ends of the sweep being welded or secured to or made with the bars, and the bars made to rest upon the ground in a line parallel to the course of the sweep, substantially as described.

In testimony whereof I affix my signature in presence of two witnesses.

HUGH L. CAMERON.

Witnesses:
R. F. JONES,
STARK WASHINGTON.